United States Patent
Leuthner

(10) Patent No.: US 6,742,346 B2
(45) Date of Patent: Jun. 1, 2004

(54) METHOD FOR OPERATING AN AIR CONDITIONING INSTALLATION

(75) Inventor: Stephan Leuthner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/332,835

(22) PCT Filed: May 25, 2002

(86) PCT No.: PCT/DE02/01929

§ 371 (c)(1),
(2), (4) Date: Jan. 13, 2002

(87) PCT Pub. No.: WO03/000514

PCT Pub. Date: Jan. 3, 2003

(65) Prior Publication Data

US 2003/0145610 A1 Aug. 7, 2003

(30) Foreign Application Priority Data

Jun. 25, 2001 (DE) .......................................... 101 30 545

(51) Int. Cl.⁷ ................................................ B60H 1/32
(52) U.S. Cl. ............................ 62/140; 62/197; 62/282; 62/82; 62/324.5
(58) Field of Search .......................... 62/140, 151, 156, 62/160, 197, 80, 81, 82, 277, 278, 282, 324.5, 196.1

(56) References Cited

U.S. PATENT DOCUMENTS

| | | | |
|---|---|---|---|
| 4,345,441 A | * 8/1982 | Hansen | 62/140 |
| 4,532,806 A | 8/1985 | Bruchmueller | 73/579 |
| 4,538,420 A | * 9/1985 | Nelson | 62/140 |
| 5,051,645 A | 9/1991 | Brace et al. | 310/313 D |
| 5,704,219 A | * 1/1998 | Suzuki et al. | 62/197 |
| 5,983,652 A | * 11/1999 | Iritani et al. | 62/156 |

FOREIGN PATENT DOCUMENTS

| | | |
|---|---|---|
| DE | 198 13 674 C | 4/1999 |
| EP | 0 945 291 A1 | 9/1999 |
| EP | 1 000 784 A | 5/2000 |

* cited by examiner

Primary Examiner—Harry B. Tanner
(74) Attorney, Agent, or Firm—Michael J. Striker

(57) ABSTRACT

The invention is based on a method for operating a climate control system for a vehicle, in the case of which a compressor (38), in a cooling mode, circulates a coolant through a gas condensing apparatus (42) and an expansion device (50) to a passenger-compartment heat exchanger (44) and, in a heating mode, circulates the coolant in the reverse direction of flow first through the passenger-compartment heat exchanger (44), the expansion device (50), and then through the gas condensing apparatus (42), in parallel with which a bypass line (56) comprising a switching valve (58) is provided. It is proposed that, in the heating mode, the switching valve (58) in the bypass line (56) is opened and the flow of coolant through the gas condensing apparatus (42) is stopped as soon as a layer of ice that exceeds a limit thickness has formed on the air side of the gas condensing apparatus (42).

3 Claims, 1 Drawing Sheet

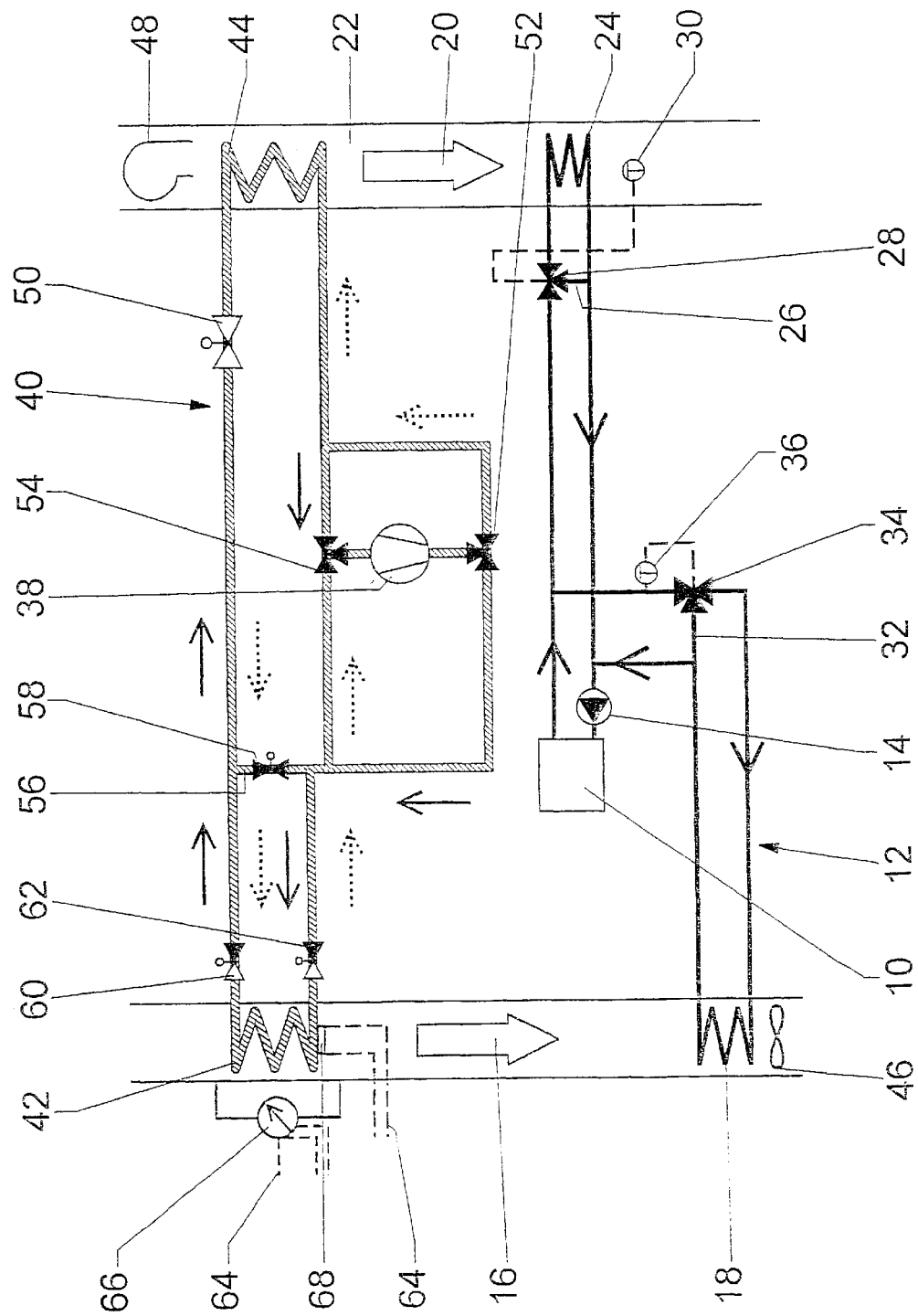

METHOD FOR OPERATING AN AIR CONDITIONING INSTALLATION

BACKGROUND OF THE INVENTION

The use of fuel-efficient internal combustion engines in vehicles has an effect on the vehicle air conditioning, however, in that, in certain operating ranges, e.g., at low outside temperatures during the starting phase, the amount of heat given off to the coolant is no longer sufficient to comfortably heat the vehicle. Auxiliary heaters are therefore necessary to ensure comfort at low temperatures and to defrost the vehicle windows if necessary. A climate control system can also serve as an auxiliary heater, especially since more and more vehicles are being equipped with a climate control system as a standard feature. At low temperatures, the climate control system is used as a heat pump by reversing the direction of coolant flow, whereby a "gas condensing apparatus"—which is part of a $CO_2$ climate control system—draws heat from the surrounding air when operated in the heating mode. The heat pump consumes relatively little energy and responds spontaneously with high heat output. A main disadvantage of such a heat pump lies in the fact, however, that ice forms on the air side of the gas condensing apparatus when outside temperatures are low. As a result, the amount of cooling air passing through the radiator—which is usually installed downstream in the air stream—of the internal combustion engine is inadequate, so that sufficient cooling of the internal combustion engine is no longer ensured when output increases over the short term, e.g., when entering a highway.

A device and a method for heating and cooling a passenger compartment of a motor vehicle is made known in EP 0 945 291 A1. In the heating mode, the coolant is compressed by a compressor and travels via a 3/2-way valve to a passenger-compartment heat exchanger, where it gives off part of the heat produced by compression to the colder air inside the passenger compartment of the vehicle. The coolant flows from the passenger-compartment heat exchanger to an expansion device, in which it is cooled down to the extent that it can absorb heat from the surrounding air in a gas condensing apparatus located downstream. Additional heat could be supplied to the coolant in a downstream exhaust-gas heat exchanger that is acted on by hot exhaust gases from the internal combustion engine.

From the exhaust-gas heat exchanger, the coolant returns to the compressor, and the coolant circuit is closed. If the coolant is expanded in the expansion device to a temperature that is below the ambient temperature, the air passing through the gas condensing apparatus can be cooled down to a temperature below the saturation temperature. In this case, water condenses out of the inducted surrounding air. If the temperature is below the sublimation line of the water, the water changes to the solid state and ice forms on the gas condensing apparatus. Since the gas condensing apparatus is usually installed upstream from a radiator of the internal combustion engine in direction of air flow, proper cooling of the internal combustion engine is endangered if ice forms on the gas condensing apparatus. To prevent excessive ice formation, a bypass line is opened via a 3/2-way valve when critical ambient conditions exist, so that the gas condensing apparatus is closed briefly. The coolant bypasses the gas condensing apparatus and flows directly to the exhaust-gas heat exchanger and, from there, to the intake of the compressor. Furthermore, a process is feasible in which the circuit is then designed as a hot-gas process, whereby the compression heat of the compressor is then used exclusively as a heat source.

ADVANTAGES OF THE INVENTION

According to the method according to the invention, in the heating mode, the switching valve in the bypass line associated with the gas condensing apparatus is opened and the flow of coolant through the gas condensing apparatus is stopped as soon as a layer of ice that exceeds a limit thickness has formed on the air side of the gas condensing apparatus. As long as the air flow on the air side of the gas condensing apparatus has a temperature above the freezing point, the ice layer thaws and is removed by the air stream. The ice layer also evaporates when the temperature of the air stream is below the freezing point, however, so that the gas condensing apparatus can be used—after some time—as a heat source once more. As a result, the run times in the heating mode—when the gas condensing apparatus is not used as a heat source—are reduced to a minimum. The amount of heat that is available is therefore so great that additional heat exchangers, e.g., exhaust-gas heat exchangers, can usually be eliminated.

Since the resistance to flow of the gas condensing apparatus increases due to the layer of ice on the gas condensing apparatus, the pressure drop on the air side of the gas condensing apparatus can be evaluated as a measure of the ice formation at critical ambient temperatures. If, at critical ambient temperatures, the pressure drop exceeds a specified limit value, the coolant flow is directed through a bypass line by means of an appropriate electronic evaluation unit controlling one switching valve at a time in the bypass line and/or in the inlet or outlet of the gas condensing apparatus.

According to another possibility, a capacitive or resistive sensor is located on the air side of the gas condensing apparatus, the capacity or resistance of which changes as a result of the ice layer. If the signal from the sensor exceeds a limit value when critical ambient parameters exist, the coolant flow is directed through the bypass line. Critical ambient parameters include, in particular, low ambient temperatures and high relative humidity.

SUMMARY OF THE DRAWINGS

Further advantages result from the following description of the drawing. An exemplary embodiment of the invention is shown in the drawing. The drawing, the description, and the claims contain numerous features in combination. One skilled in the art will advantageously consider them individually as well and combine them into reasonable further combinations.

The sole FIGURE shows a schematic layout of a climate control system according to the invention.

DESCRIPTION OF THE PREFERRED EMBODIMENT

A vehicle—not shown in greater detail—comprises an internal combustion engine 10 having a coolant circuit 12. In said coolant circuit, a coolant pump 14 circulates coolant through the internal combustion engine 10, a heater core 24, and a radiator 18. A bypass line 26 is provided in parallel with the heater core 24. A heating regulator valve 28 divides the coolant flow between the heater core 24 and the bypass line 26, depending on a signal from a temperature sensor 30.

A bypass line 32 is also provided in parallel with the radiator 18, whereby the coolant flow is divided by a further three-way valve depending on the signal from a further temperature sensor 36.

The vehicle has an air conditioner 22 for air conditioning a passenger compartment. In the air conditioner 22, a passenger-compartment heat exchanger 44 is installed upstream from the heater core 24 in the direction of a conditioned-air stream 20. The conditioned-air stream 20 is generated by a blower 48 that draws in either fresh air from the surroundings or circulating air from the passenger compartment and acts on the heater core 24 and the passenger-compartment heat exchanger 44.

The passenger-compartment heat exchanger 44 is part of a coolant circuit 40, the coolant of which, e.g., $CO_2$, is circulated by a compressor 38. The coolant circuit 40 can be operated in a heating mode or a cooling mode. In the cooling mode, the compressor 38 circulates the compressed coolant through a three-way valve 52 in the direction of the solid-black arrow through a switching valve 62, a gas condensing apparatus 42, a further switching valve 60, and an expansion device 50 to the passenger-compartment heat exchanger 44 and, from there, through a further three-way valve 54, back to the intake of the compressor 38. The compressed coolant is cooled in the gas condensing apparatus 42 by an air stream 16 that is produced by a fan 46 and acts on the gas condensing apparatus 42 as well as the downstream radiator 18 of the internal combustion engine 10. In the expansion device 50, the coolant is expanded to a desired temperature, so that, in the downstream passenger-compartment heat exchanger 44, it can absorb an appropriate amount of heat from the conditioned-air stream 20.

In the heating mode, the three-way valve 52 is adjusted in such a fashion that the compressor 38 first circulates the compressed coolant in the direction of the dotted arrows to the passenger-compartment heat exchanger 44, where it transfers heat produced by the compression of the coolant to the conditioned-air stream 20. This takes place, in particular, in operating ranges in which the amount of heat available to the heater core 24 from the coolant circuit 12 is insufficient. After the passenger-compartment heat exchanger 44, the coolant is expanded in the expansion device 50, so that it can absorb heat from the air stream 16 when it flows through the adjacent gas condensing apparatus 42. The warmed coolant flows through the appropriately adjusted three-way valve 54 back to the intake of the compressor 38.

In the presence of critical ambient parameters, in particular at low outside temperatures and high humidity, there is a risk of an ice layer forming on the gas condensing apparatus 42 and inhibiting the air stream 16, so that the cooling of the internal combustion engine 10 by the radiator 18 could be endangered. To prevent the ice formation from exceeding an impermissible level, a switching valve 58 opens a bypass line 56, and the flow of coolant through the gas condensing apparatus 42 is stopped by a switching valve 62 and/or 60 on the gas condensing apparatus 42 as soon as an ice layer that exceeds a limit thickness has formed on the air side of the gas condensing apparatus 42. In this operating range, the coolant circuit 40 is operated in the "hot-gas mode", in which the coolant is expanded not at all or only slightly in the expansion device 50, and only the compression heat from the compressor 38 is utilized in the passenger-compartment heat exchanger 44. In the hot-gas mode, the ice layer is thawed or evaporated by the air stream 16, so that operation in the heat pump mode can be continued after a certain period of time in that the switching valve 58 closes and switching valves 60, 62 open.

Since the resistance to flow through the gas condensing apparatus 42 increases on the air side when the ice layer increases and, as a result, the pressure drop at the gas condensing apparatus 42 increases, the pressure drop is detected by means of a pressure differential sensor 66 and delivered via signal lines 62 to a not-further-shown evaluation unit that triggers switching valves 58, 60, 62 and the expansion device 50 as a function of the sensor signal and the ambient parameters. Instead of the pressure differential sensor 66 or in addition thereto, a sensor 68 can be situated on the gas condensing apparatus 42 that operates according to a capacitive or resistive principle, whereby the capacity or the electrical resistance of the sensor 68 changes if an ice layer forms and/or the ice layer increases. The signal from the sensor 68 is also delivered via signal lines 64 to the evaluation unit.

Reference Numerals

10 Internal combustion engine
12 Coolant circuit
14 Coolant pump
16 Air stream
18 Radiator
20 Conditioned-air stream
22 Air conditioner
24 Heater core
26 Bypass line
28 Heating regulator valve
30 Temperature sensor
32 Bypass line
34 Three-way valve
36 Temperature sensor
38 Compressor
40 Coolant circuit
42 Gas condensing apparatus
44 Passenger-compartment heat exchanger
46 Fan
48 Blower
50 Expansion device
52 Three-way valve
54 Three-way valve
56 Bypass line
58 Switching valve
60 Switching valve
62 Switching valve
64 Signal line
66 Pressure differential sensor
68 Sensor

What is claimed is:

1. A method for operating a climate control system for a vehicle, in the case of which a compressor (38), in a cooling mode, circulates a coolant through a gas condensing apparatus (42) and an expansion device (50) to a passenger-compartment heat exchanger (44) and, in a heating mode, circulates the coolant in the reverse direction of flow first through the passenger-compartment heat exchanger (44), the expansion device (50) and then through the gas condensing apparatus (42), in parallel with which a bypass line (56) comprising a switching valve (58) is provided, wherein, in the heating mode, the switching valve (58) in the bypass line (56) is opened and the flow of coolant through the gas condensing apparatus (42) is stopped as soon as an ice layer that exceeds a limit thickness has formed on the air side of the gas condensing apparatus (42).

2. The method according to claim 1, wherein the pressure drop on the air side of the gas condensing apparatus (42) is measured and, if critical ambient parameters exist, the coolant flow is directed through the bypass line (56) when the pressure drop exceeds a limit value.

3. The method according to one of the preceding claims, wherein a capacitive or resistive sensor (68) is located on the air side of the gas condensing apparatus (42), the capacity and/or resistance of which changes as a result of the ice layer, and when critical ambient parameters exist, the coolant flow is directed through the bypass line (56) when the signal from the sensor (68) exceeds a limit value.

\* \* \* \* \*